(12) United States Patent
Schiller

(10) Patent No.: US 7,394,165 B2
(45) Date of Patent: Jul. 1, 2008

(54) LUGGAGE WITH POWER SUPPLY CIRCUIT

(75) Inventor: Jay Schiller, 1294 S. Vine St., Denver, CO (US) 80210

(73) Assignee: Jay Schiller, Denver, CO (US)

( * ) Notice: Subject to any disclaimer, the term of this patent is extended or adjusted under 35 U.S.C. 154(b) by 139 days.

(21) Appl. No.: 11/382,884

(22) Filed: May 11, 2006

(65) Prior Publication Data

US 2007/0090702 A1    Apr. 26, 2007

Related U.S. Application Data

(60) Provisional application No. 60/767,314, filed on Mar. 16, 2006, provisional application No. 60/766,500, filed on Jan. 24, 2006, provisional application No. 60/766,381, filed on Jan. 14, 2006, provisional application No. 60/597,274, filed on Nov. 20, 2005, provisional application No. 60/728,935, filed on Oct. 22, 2005.

(51) Int. Cl.
*H02P 9/00* (2006.01)

(52) U.S. Cl. .......................... 290/1 R; 290/1 A; 322/1; 189/221

(58) Field of Classification Search ................. 290/1 R, 290/1 A, 1 C, 4 R, 6, 45; 320/125; 322/1, 322/28; 180/221
See application file for complete search history.

(56) References Cited

U.S. PATENT DOCUMENTS

| 2,088,029 | A |   | 7/1937 | Mc Dermott |       |
|-----------|---|---|--------|------------|-------|
| 2,505,154 | A | * | 4/1950 | Smith      | 315/78 |
| 4,325,108 | A |   | 4/1982 | Spingler   |       |
| 4,405,872 | A |   | 9/1983 | Thomas     |       |
| 4,418,776 | A |   | 12/1983 | Weirick   |       |
| 4,837,494 | A | * | 6/1989 | Maier      | 322/1 |
| 5,316,101 | A | * | 5/1994 | Gannon     | 180/221 |
| 5,634,707 | A | * | 6/1997 | Bailey, Jr. | 362/500 |
| 5,910,714 | A | * | 6/1999 | Buchanan et al. | 318/139 |
| 6,688,636 | B2 | * | 2/2004 | Han       | 280/655 |
| 6,870,089 | B1 |   | 3/2005 | Gray      |       |
| 6,987,327 | B1 | * | 1/2006 | Lucatero  | 290/1 A |
| 7,009,350 | B1 | * | 3/2006 | Gold      | 318/142 |
| 7,021,978 | B2 | * | 4/2006 | Jansen    | 440/6 |
| 2006/0032687 | A1 | * | 2/2006 | Park et al. | 180/206 |

* cited by examiner

*Primary Examiner*—Nicholas Ponomarenko
(74) *Attorney, Agent, or Firm*—Townsend and Townsend and Crew LLP

(57) ABSTRACT

According to the invention, a human-propellable luggage which converts motion of the luggage into conditioned electrical power is provided. The luggage may have a body, chassis, wheel, generator and power supply circuit. The body may be configured to support an object and to be moved by a force exerted by a user. The wheel may define an axis of rotation and be coupled with the body. The wheel may be configured to be in contact with a surface and rotate about the axis of rotation when the body is moved relative to the surface. The generator may be coupled with the wheel and may be configured to convert the rotation of the wheel about the axis of rotation into electrical power. The power supply circuit may be coupled with the generator and be configured to receive the electrical power from the generator and condition the electrical power for use externally.

28 Claims, 15 Drawing Sheets

LUGGAGE WITH POWER SUPPLY CIRCUIT

PRIORITY CLAIM

This application claims priority to Provisional U.S. Patent Application No. 60/767,314 filed Mar. 16, 2006, entitled "Wheeled Luggage with Electrical Generator for Charging Battery Devices;" Provisional U.S. Patent Application No. 60/766,500 filed Jan. 24, 2006, entitled "Luggage with Electric Motor and Generator;" Provisional U.S. Patent Application No. 60/766,381 filed Jan. 14, 2006, entitled "Luggage with Electric Motor;" Provisional U.S. Patent Application No. 60/597,274 filed Nov. 20, 2005, entitled "Luggage with Electrical Power Generation;" Provisional U.S. Patent Application No. 60/728,935 filed Oct. 22, 2005, entitled "Luggage with Electrical Power Generator." The entire disclosure of all of the aforementioned Provisional U.S. Patent Applications are hereby incorporated by reference as if fully set forth herein.

BACKGROUND OF THE INVENTION

Luggage is used regularly by travelers to assist in moving belongings during both short and long excursions. Today, luggage manufacturers often equip luggage with wheels to assist travelers in moving the luggage, which depending on the type of luggage and the amount of belongings held inside, can be heavy. Wheels are coupled to some portion of the luggage, possibly a separate chassis coupled with the body of the luggage during its manufacture, and the user of the luggage either pulls or pushes the luggage such that the wheels roll along the ground and support the luggage. In this fashion, the user must only exert enough force to make the wheels turn, a significantly smaller force than is required to pick up and move the luggage manually.

Other devices used regularly by travelers are portable electronic devices. Mobile phones, personal data assistants, portable audio/video devices, portable video games, cameras, and handheld/notebook/laptop computers are just a few of the many devices that make traveling easier and more convenient. These devices are equipped with batteries that store power for use by the devices. However, when the batteries are exhausted, the devices are inoperable unless a source of power is available to recharge the batteries and/or supply power directly to the device in lieu of battery power.

Airports, train stations, bus terminals, and mass transit locations may not necessarily have power outlets available for travelers to recharge and/or power portable electronic devices. When power outlets are available, they may be so few in number as to allow only a minimal number of travelers access to them. Furthermore, travelers are often not stationary for a long enough period of time to plug into a power outlet and wait to recharge because they are moving between areas such as parking lots, check-in counters, baggage claims, and/or terminals.

Even when access to a power outlet is available, many portable electronic devices may have a Universal Serial Bus ("USB") plugs to connect to a USB receptacle for power source in a laptop or USB hub rather than a separate power supply that can be plugged into a standard outlet receptacle. In this case, unless the traveler can access a powered computer having a USB connection, or has a powered laptop or notebook computer having a USB connection, there will be no way to power the device to recharge its batteries. Additionally, a laptop or notebook computer will also require a power source if battery power in the computer is low or exhausted.

BRIEF DESCRIPTION OF THE DRAWINGS

The present invention is described in conjunction with the appended figures.

Figure 1:
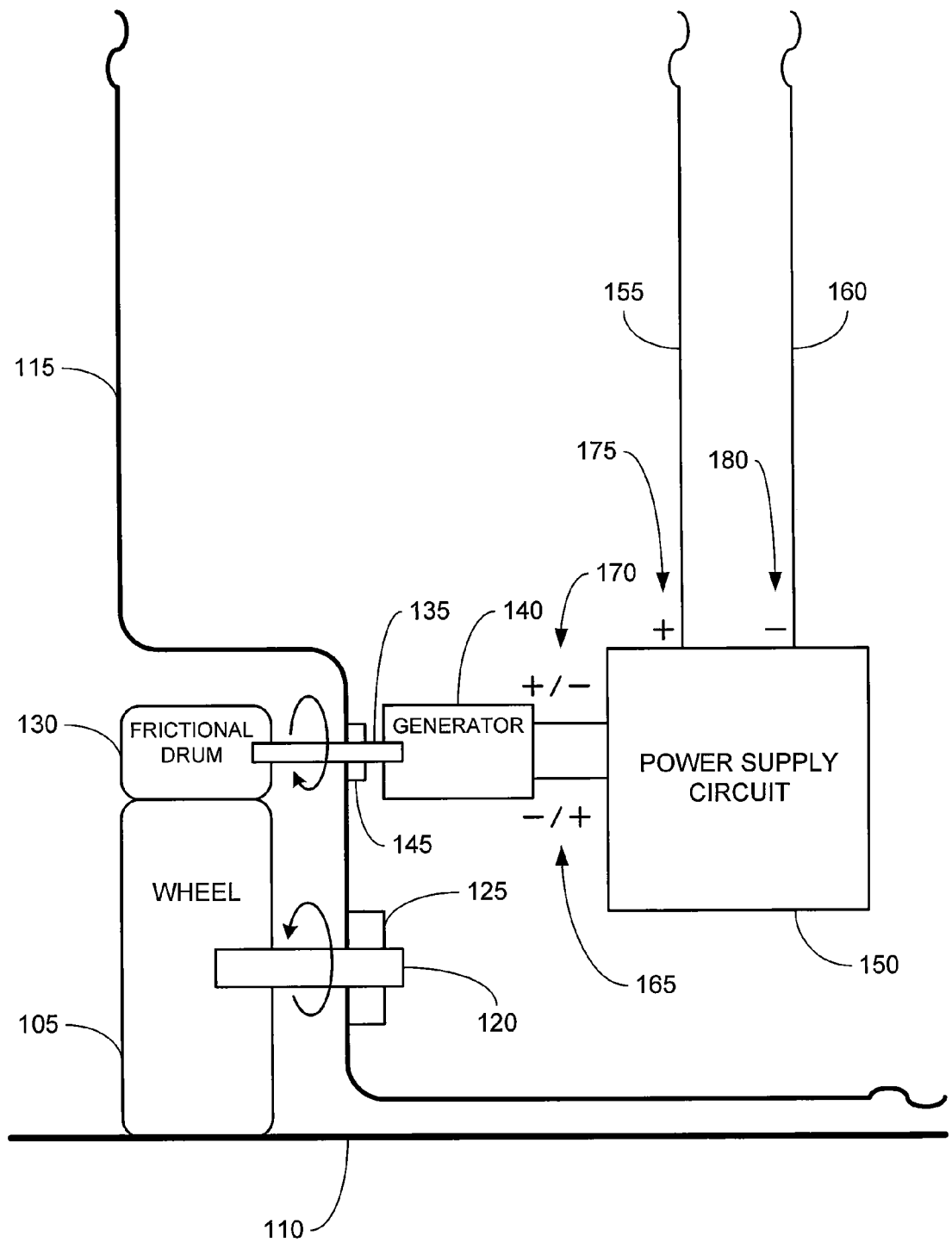
FIG. 1 is a block diagram of a piece of human-propellable luggage which converts motion into conditioned electrical power using a frictional drum to couple a wheel to a generator.

In the appended figures, similar components and/or features may have the same reference label. Where the reference label is used in the specification, the description is applicable to any one of the similar components having the same reference label.

DETAILED DESCRIPTION OF THE INVENTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing a preferred exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. Some operations in a flowchart may not be performed in different embodiments of the invention. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

In one embodiment of the invention, a piece of human-propellable luggage is described that converts motion of the luggage into conditioned electrical power. The luggage may have a body, a wheel, a generator, a power supply circuit, and/or an externally accessible connector. Some embodiments may have a chassis which includes the wheel, the chassis being coupled with the body. The chassis may also include the generator and/or the power supply circuit, and/or the externally accessible connector. In some of these embodiments, the chassis with included components may be attached to the body of the luggage using mechanical fasteners known in the art, with little or no other integration required with the luggage. The generator converts the motion of the luggage into electrical energy. The power supply circuit may condition the electrical energy so that it is usable to power and/or recharge an end device. The voltage and/or current of the electrical power created by the generator may be variable depending on the motion characteristics of the luggage and the physical characteristics of the generator. Merely by way of example, voltage and/or current produced by the generator may increase with the speed of the luggage's motion (walking speed of the user); voltage polarity may depend on the rotational direction of the wheels; and fluctuations and/or ripples in the voltage and/or current may be a function of the physical characteristics and/or quality of the generator. The voltage variations in the electrical power produced by the generator may not be usable by end devices. Therefore the electrical power may need to be conditioned by the power supply circuit, possibly to supply a fixed voltage and/or a maximum current before it is provided to an end device.

Conditioning may include, for example, modifying the current or voltage characteristics of the generated electrical power, possibly to match the electrical power constraints of a given end device or range of supported end devices. The conditioned electrical power may be provided to a USB compatible externally accessible connector, possibly on the exterior of some portion of the body or the chassis where a compatible connector may be plugged in to power and/or charge an end device. Other types of detachable connectors may also be used in various embodiments, including, but not limited to, FireWire, tip or barrel connectors and/or manufacturer-unique connectors.

The body may be configured to support at least one object and may be a suitcase, trunk, briefcase, duffle-bag, garment bag, backpack, golf club case, ski or snowboard pack, and/or a laptop/notebook case. Objects may be put into some portion of the body, put on top of some portion of the body, attached to some portion of the body, or somehow otherwise borne by the body. The body may have specific areas, possibly external or internal, for holding end devices such as mobile phones, personal data assistants, portable audio/video devices, portable video games, cameras, and/or handheld/notebook/laptop computers. The body may have at least one wheel coupled to the body such that the wheel is free to rotate with respect to the body. The wheel may be coupled with a chassis which is coupled with the body. The wheel may be configured to be in contact with a surface and when a force is exerted by a user on the body, the body may move relative to the surface. The wheel may define an axis of rotation and rotate about the axis of rotation when the body is moved. The axis of rotation may be stationary with respect to the body. The axis of rotation may be stationary with respect to a chassis and/or an axle which is stationary with respect to the body or chassis. The luggage may also have a leash, handle, or extendable handle to facilitate the user exerting a force on the luggage.

The generator may be coupled with the wheel and configured to convert the rotation of the wheel about the axis of rotation into electrical power. The generator may be a commodity, low cost, and/or commonly available for use as a generator and/or a motor in a multitude of product applications including, but not limited to, consumer electronics, personal care, and toys. The generator may be a permanent magnet low cost type manufactured to operate as a motor and/or a generator. Internally, the generator may have a magnet, a rotor with wire coiled around it and a commutator where the wires terminate, and conductive brushes. The generator may also have a shaft which may be coupled with the rotor, and may have a set of contacts or terminals which may be coupled to the brushes.

The generator may by cylindrical with a length and diameter. The generator may be about 1.25 inches long and may have a shaft extending about 0.5 inches further for an end-to-end length of about 1.75 inches. The generator may be about 1 inch in diameter. The generator may have a gear on the end of the shaft which has a diameter of about 0.25 inches. The generator and/or shaft may be longer or shorter. The generator may be larger in diameter or smaller in diameter. The generator may produce about 0 volts when the shaft is rotated at about 0 RPM and about 12 volts when the shaft is rotated at about 5600 RPM in the clockwise direction and may possibly perform linearly in between. The generator may produce about 0 volts when the shaft is rotated at about 0 RPM and about negative 12 volts when the shaft is rotated at about 5600 RPM in the counter-clockwise direction and may possibly perform linearly in between. The generator may supply about 100 milliamps and/or possibly about 1.2 watts. The generator may weigh about two ounces in some embodiments.

The generator may be coupled to the wheel in various ways. In one embodiment, the shaft of the generator may be coupled with a frictional drum, and the frictional drum may be in contact with the wheel and configured to rotate when the wheel rotates because of friction between the frictional drum and the wheel. The frictional drum may be made from numerous materials, including plastics, rubbers, other polymers, composites, metal or any material suitable for transferring rotational motion from the wheel to apparatuses coupled with the frictional drum. Materials for the wheel and frictional drum may be selected such as to reduce wear of either the wheel or frictional drum.

In another embodiment, the shaft of the generator may be coupled with a gear set, and the gear set may further be coupled with the wheel. The gear set may include two or more gears, where one gear is fixedly coupled with the shaft of the generator, and another gear is fixedly coupled to either the wheel rotating around a fixed axle or to a shaft fixedly coupled with the wheel at the axis of rotation. In such an embodiment, the two gears either mesh directly or indirectly through other gears, such that rotation of the wheel is communicated to the shaft of the generator. Gear sets may consist of gears in parallel planes or in perpendicular planes. Other mechanisms for coupling the shaft of the generator with the wheel may include sheaves, pulleys, sprockets, belts and chains. The generator shaft may enter some portion of the body and/or chassis through a penetration in order to be coupled with the wheel gear while keeping the generator internalized to some portion of the body or the chassis. A grommet may be placed around the generator shaft in the penetration to mitigate ingress of moisture and/or debris from entering the location of the generator and power supply circuit and other components.

In some embodiments, gear sets may be used to multiply the rate of rotational input into the generator. Some generators may require a minimum amount of rotational input to generate electrical power, so a gear set with a positive gear ratio may be required. For example, in an embodiment where typical wheel speeds are between about 300 and 400 rotations per minute ("RPM"), a gear set with a gear ratio of about 1:10 may be used to increase the rotation input into the generator to between about 3000 RPM to 4000 RPM, possibly to achieve the desired range and/or variations of voltage levels required by the power supply circuit to achieve a fixed output. In embodiments with frictional drums, gear ratios are present between the frictional drum and wheel causing multiplication of rotational input. Those skilled in the art will recognize that the gear ratio in such configurations is a characteristic of the relationship between the diameters of the frictional drum and wheel.

In another embodiment, the shaft of the generator being coupled to the wheel may consist of the shaft of the generator being coupled with a rotational coupling to a shaft fixedly coupled with the wheel. In other embodiments the wheel may be directly coupled to the shaft of the generator. Other methods, known in the art, are possible within the scope of the invention for coupling the wheel to the shaft of the generator such that rotation of the wheel is communicated to the generator. In some of these embodiments, the generator may have an integral gear set.

The generator may also be configured to provide the electrical power, possibly to the power supply circuit. The power supply circuit may be coupled with the generator and may receive the electrical power from the generator through the coupling. The power supply circuit may be configured to condition the electrical power possibly to a fixed voltage such as about 5 volts and maximum current limit such as about 100 milliamps for a total power of about 0.5 Watts. The generator may be coupled to the power supply circuit with wires or a cabling between the generator terminals and the power supply circuit since the generator may be near the wheel and the power supply circuit may be located elsewhere on the luggage or in close proximity. Connectors, screw terminals, or electrical solder may be used on one or all of the ends of the wires or cables, possibly to couple them with the generator terminals and/or power supply circuit electrical inputs.

Conditioning the electrical power received from the generator may include many different types of operations, possibly occurring at the power supply circuit. In some embodiments, conditioning the electrical power may include smoothing and regulating variations, fluctuations or ripples in voltage and current and/or modifying the voltage level and current (possibly limiting the current to a certain level). This may be accomplished, in some embodiments, by the power supply circuit having a low pass filter configured to smooth variations or ripples in the voltage and/or the current. In some embodiments the low pass filter may be a resistor-capacitor filter with the resistor and capacitor in parallel to ground. A voltage regulator may be present in some embodiments and be configured to regulate variations in the voltage, possibly to provide a fixed voltage from a wide range of voltage inputs produced by the generator. The voltage regulator may be a linear or switching regulator. In embodiments with a switching regulator, the power supply circuit may also include an external inductor at the output of the switching regulator. In some embodiments, the linear or switching voltage regulator may be a fixed or adjustable type. In some embodiments, the power supply circuit may also have resistors, capacitors, transistors, integrated circuits, diodes, and/or inductors as required by the voltage regulator design configuration to condition the electrical power and/or assist in the functioning of other components of the power supply circuit. In some embodiments, the voltage regulator may be a Zener diode in series with a resistor.

In some embodiments the power supply circuit may have heat sinks for heat dissipation. The power supply circuit may also include a printed circuit board. The power supply circuit may output conditioned electrical power to an externally accessible connector or receptacle or jack into which end devices may be plugged in directly or through a cable a compatible connector plug or adaptor. The externally accessible connector may be external to the main luggage compartment and may be within a pocket or bracket or exposed and mounted in the luggage top, side, front, back, bottom or handle. The externally accessible connector may be electrically connected with the power supply circuit with cables or wires so that the externally accessible connector may be located, for example, near the top of the body while power supply circuit may be located at the bottom of the body and/or in the chassis holding the wheels. Connectors, screw terminals, or electrical solder may be used on one end of these wires or cable possibly to couple the wires or cable with the power supply circuit's conditioned electrical power output.

In some embodiments, the power supply circuit may include multiple voltage regulators. Each voltage regulator in these embodiments may provide a different fixed voltage. Each of the different voltages may possibly be intended for use with different end devices requiring different voltage inputs. In one example, the power supply circuit may include three voltage regulators, one providing a 5 volt output, another providing 9 volts, while the third may provide 12 volts. In some embodiments, each voltage may be available externally through multiple externally accessible connectors or through a single externally accessible connector where the output level can set with a knob, switch, lever or dial.

In some embodiments, the power supply circuit may also include a device to limit the voltage applied to the power supply circuit from the generator to a certain polarity, possibly corresponding to one rotational direction of the shaft of the generator. This may be accomplished, in some embodiments, by the power supply circuit having at least one diode. Similarly, a diode or other device may also be used to prevent electrical power from being provided to the generator, causing it to possibly respond like a motor, outputting rotational motion to the wheels.

In other embodiments, conditioning the electrical power in the power supply circuit may include reversing the polarity of the voltage provided from the generator which changes depending on the directional rotation of the wheels. This may be accomplished, in some embodiments, by the power supply circuit having a bridge rectifier configured to accept voltage of either polarity from the generator while outputting a single forward polarity voltage to the other components in the power supply circuit regardless of the polarity (forward or reverse) being output from the generator.

In some embodiments, conditioning the electrical power may include changing the magnitude of the voltage and/or modifying or limiting the current. This may be accomplished, in some embodiments, by the power supply circuit having at least one resistor. The resistor or resistors may be put in series or in parallel with downstream loads to change the voltage and/or modifying or limiting the current.

Furthermore, in some embodiments, the power supply circuit may comprise a USB conditioning circuit configured to make the output of the power supply circuit behave like a USB power source and/or a USB data transceiver as defined by the standard Universal Serial Bus (USB) Revision 1.1 and 2.0 specifications. The USB conditioning circuit may emulate the voltage, current, and impedance characteristics of the two data contacts (or pins) as required by industry standard USB transceiver circuits described in the industry standard USB specification, in addition to electrical power described in the specifications of about 5 volts and up to about 500 milliamps. In some embodiments this may allow end devices to utilize the electrical power for operation and/or recharge of the end device's battery. Some end devices may verify that the USB data transceiver's electrical characteristics at the data terminals are compliant before accepting electrical power from a USB source. Some end devices may not verify that the USB data transceiver's electrical characteristics at the data terminals are compliant, while some may not even have electrical contact with the data terminals before accepting electrical power from a USB source. In these or other embodiments, the connection point for an end device to receive power from the power supply circuit may be a female type A or B USB connection as an externally accessible connector electrically coupled with the power supply circuit. The end device may have a power supply cable that has a male type A or B USB connector which may couple with said connection, as desired by a user, at the externally accessible connector. USB power may allow many different end devices to use the same power source. Other standard interfaces may be supported with conditioning circuits and externally accessible connector and may provide power and emulate data according to standards such as FireWire.

In some embodiments, the power supply circuit may also include a battery and battery manager circuit. The battery may be configured to receive and store the conditioned electrical power. The battery may be a rechargeable type, possibly a Lithium Ion or Nickel-Cadmium battery. The battery manager circuit may manage the battery charge process. Embodiments which have a battery may have a battery charge indicator device, possible a series of LED lights or a LCD display. In embodiments without batteries, indicator devices may display a representation of whether electrical power is available from the power supply circuit and/or how much electrical power is being generated.

In some embodiments, the generator and power supply circuit may be at least partially physically integrated. In some embodiments, the generator and power supply circuit may be electrically connected with wires or other connectors known in the art. Additionally, some portion or all of the wheel, generator, power supply circuit and/or other components may be detachably coupled with the body of the luggage, possibly integrated with a separate chassis, such that it may more easily be serviced or replaced or manufactured. In some embodiments, the generator and power supply circuit may be detachably coupled with the body, separate from the chassis which may be coupled with a wheel. In other embodiments, the generator and power supply circuit may each be separately and detachably coupled with the body separate from the wheel and chassis. In yet other embodiments, the generator may be detachably coupled with the wheel, chassis, and power supply circuit and may be separately detachably coupled with the body. In other embodiments, the externally accessible connector may be detachably coupled with the power supply circuit or may be detachably coupled with the chassis or body. In these embodiments, the chassis and/or other detachably coupled components may be mechanically coupled with the body with mechanical fasteners known in the art. Connection points at the chassis, or a cable or cables running from the chassis may deliver the conditioned electrical power to another point on the luggage, or possibly directly to an end device. In this manner, the invention provides a separate chassis assembly which may be attached by a luggage manufacturer to otherwise normally produced luggage. Some portion of the wheel and/or generator may possibly be spring loaded to assist in coupling the generator coupling with the wheel. For instance, in embodiments using a frictional drum to couple the generator to the wheel, a spring, or other force producing device, may apply a force to the generator to ensure enough friction exists between the wheel and frication drum to communicate rotational motion of the wheel to the generator.

The power supply circuit may be configured to output the conditioned electrical power through an externally accessible connector or jack or receptacle connector, into which a user may plug in an adapter, dongle, or directly to an end device. The adapter may be configured to receive the conditioned electrical power from the externally accessible connector and provide the conditioned electrical power to an end device. Merely by way of example, the adapter may have two male connector ends. One end may couple with a female receptacle on the luggage which is electrically and mechanically coupled with the externally accessible connector. The other end of the adapter may couple with the end device. The adapter may include a cable with connectors on either end.

Adaptors with connectors matching the connector of the externally accessible connector may be available for a wide range of end devices. Adaptors may have USB connectors which plug into an externally accessible USB receptacle and such adaptors may also include a cable between its end connectors. Such adapters are commonly available for many end devices.

In some embodiments, the adapter may receive unconditioned electrical power from another component, condition the electrical power, and provide the conditioned electrical power to an end device. The adapter may possibly receive the unconditioned electrical power from a generator or an externally accessible connector. In other embodiments, the adapter may be configured to "inform" a power supply circuit what voltage and/or current of conditioned electrical power to provide to the adapter for delivery to an end device.

In some of these embodiments, the power supply circuit, or an intermediate circuit in between the power supply circuit and the adapter, may have a device to determine from electrical characteristics of the adapter and respond by providing a certain voltage and/or current of conditioned electrical power to the adapter. In one possible example, the adapter may have multiple electrical contacts that interface with an externally accessible connector with a like number of electrical contacts. The intermediate circuit may determine that multiple contacts are shorted and configure the power supply circuit to deliver a certain voltage and/or current of conditioned electrical power based on the existence of shorted contacts.

In other types of embodiments where adapter "informs" the power supply circuit what voltage and/or current of conditioned electrical power to provide, the adapter may include certain resistors, capacitors, transistors, integrated circuits, diodes, and/or inductors as required to configure a voltage regulator or other component in the power supply circuit. The electrical components of the adapter may be coupled with electrical contacts on the adapter that interface with an externally accessible connector such that the power circuit is thereby configured to deliver a certain voltage and/or current. For example, some variable voltage regulators known in the art will deliver different voltages if different electrical components such as resistors and/or capacitors are applied to contacts on the variable voltage regulator.

End devices include any device that requires electrical power to operate, including, but not limited to: mobile phones, personal data assistants, portable audio/video devices, portable video games, cameras, and handheld/notebook/laptop computers. Many end devices may primarily use direct-current electrical power to operate and/or recharge their batteries.

In some embodiments, the adapter may be physical connection adapter, designed to allow a power supply circuit output connection point to connect with a physically different connection point on an end device. For instance, the output of the power supply circuit may be a female tip or barrel connector, while the end device, possibly a mobile phone, may have a female manufacturer-unique connector. In this example, the adapter may have a male tip or barrel connector to match the power supply circuit output and a male manufacturer-unique connector to match the end device.

In some embodiments, the adapter may have a secondary circuit. The secondary circuit may be configured to further condition the conditioned electrical power received from the power supply circuit or external connector before providing the conditioned electrical power to the end device. For instance, the secondary circuit may change the magnitude of the voltage or further limit the current of the conditioned electrical power received from the power supply circuit or external connector. In some embodiments the power supply circuit may also have a USB conditioning circuit, which as described above, may make the output from the adapter behave like a USB power source and a USB data transceiver. The secondary circuit may also be configured to provide power and emulate data according to standards such as FireWire.

In another embodiment of the invention, a similar piece of human-propellable luggage is described that converts motion of the luggage into conditioned electrical power. In this embodiment, a body may be coupled with a plurality of wheels and each wheel may be coupled with one of a plurality of generators. The plurality of wheels may be coupled to a chassis or plurality of chassis and the chassis may be coupled to the body. As described above in regards to embodiments with one wheel, the wheels, generators, and power supply circuit or circuits may be integrated with the chassis. The chassis unit or units in these embodiments may then be mechanically coupled with the body for ease of assembly or repair and replacement. Additionally, in these embodiments the chassis with associated coupled components may be added as an after-market addition to an existing piece of luggage. The wheels of the invention may be in addition to, or replace any wheels which may already exist on the luggage.

The luggage may further have a power supply circuit that is configured to receive electrical power from the plurality of generators and combine and condition the electrical power. Combining the electrical power from the plurality of generators may be accomplished, in some embodiments, by the power supply circuit having a plurality of bridge rectifiers which may be configured in series to combine or sum the electrical power. In some embodiments, the bridge rectifiers may also be configured to reverse polarity of the voltage produced by the various generators so that the combined voltage is the mathematical sum of the absolute (positive) values of each, regardless of the direction of rotation of the various wheels. In some of these embodiments, the power supply circuit may also have a battery configured to receive and store the combined and conditioned power. Adapters may also be provided in these embodiments, and may further condition the electrical power before providing the electrical power to an end device.

In another embodiment of the invention, a method of converting motion of a human-propellable luggage into conditioned electrical power is described. The method may provide the human-propellable luggage and a surface. The method may translate motion of the human-propellable luggage relative to the surface into rotational motion, wherein the motion relative to the surface may be produced during normal operation of the human-propellable luggage.

The method may receive the rotational motion with at least one generator. The method may convert the rotational motion into electrical power with the generator or generators. The method may condition and output the electrical power.

In some embodiments, the method may also combine the electrical power from a plurality of generators. In some embodiments, the method may also store the conditioned electrical power using a battery and may have a battery manager circuit to manage the battery charge process.

Turning now to FIG. 1, a block diagram of a portion of a piece of human-propellable luggage 100 which converts motion into conditioned electrical power is shown. In this exemplary embodiment, a wheel 105 is in contact with a surface 110 and coupled with a body 115. Wheel 105 is fixedly coupled with a wheel shaft 120, which is rotationally coupled with body 115, possibly using a first bearing or bushing 125 fixedly coupled with body 115 to reduce friction and improve durability. A frictional drum 130 is in contact with wheel 105. Frictional drum 130 is fixedly coupled with the shaft 135 of a generator 140. Generator 140 is fixedly coupled with body 115, and the shaft 135 of generator 140 may be rotationally coupled with body 115 as well, possibly using a second bearing or bushing 145 fixedly coupled with body 115 to reduce friction and improve durability. Generator 140 is electrically coupled with power supply circuit 150. Leads 155, 160 are electrically coupled with power supply circuit 150, and continue to another portion of body 115 to output connections.

In operation, luggage 100 is moved by a user and rolls along surface 110, thereby turning wheel 105 due to friction with surface 110. Frictional drum 130 rotates due to friction with rotating wheel 130, thereby turning the shaft 135 of generator 140. Generator 140 converts rotational motion of wheel 105 into electrical power and provides the electrical power to power supply circuit 150. In one rotational direction of wheel 105, generator 140 may produce voltage of one polarity, while in the other rotational direction of wheel 105, generator 140 may produce voltage of a reverse polarity as shown by indicators 165, 170. Power supply circuit 150 may condition the electrical power provided by generator 140 and provide the conditioned electrical power to leads 155, 160. In some embodiments, power supply circuit 150 may not accept voltage from generator 140 which is in one polarity or another. In these embodiments, power supply circuit 150 may output voltage in one polarity only as indicated by indicators 175, 180. In other embodiments, power supply circuit 150 may selectively reverse the polarity of the inputted voltage 165, 170 and output conditioned electrical power to leads 155 and 160.

Figure 2A:
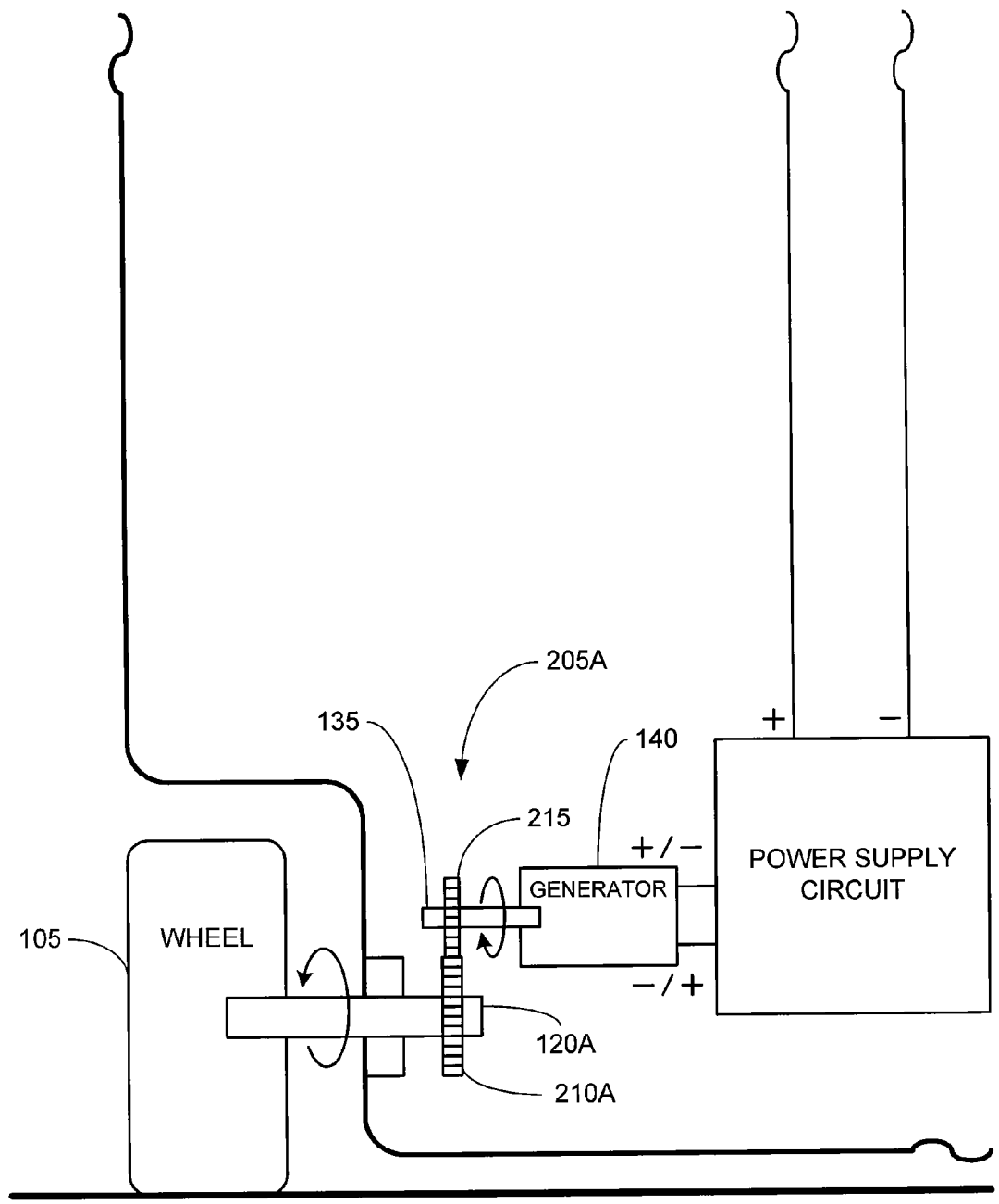
FIG. 2A is a block diagram of a piece of human-propellable luggage, similar to the human propellable luggage of FIG. 1, except using a gear set to couple the wheel to the generator.

FIG. 2A is a block diagram of a portion of a piece of human-propellable luggage 200, similar to the human propellable luggage 100 of FIG. 1, except using a gear set 205A to couple wheel 105 to generator 140. In this exemplary embodiment, gear set 205A consists of a first gear 210A and a second gear 215. First gear 210A is fixedly coupled with wheel shaft 120A. Second gear 215 is fixedly coupled with the shaft 135 of generator 140. First gear 210A and second gear 215 are meshed such that rotation of one is communicated to the other. As wheel 105 rotates, wheel shaft 120A and first gear 210A rotate. Because first gear 210A is meshed with second gear 215, the shaft 135 of generator 140 rotates and generator 140 converts the rotational motion into electrical power. As discussed, other methods are possible within the scope of the invention for coupling the wheel to the generator. For instance, first gear 210A and second gear 215 could be beveled gears allowing perpendicular orientation of wheel shaft 120A and the shaft 135 of generator 140.

Figure 2B:
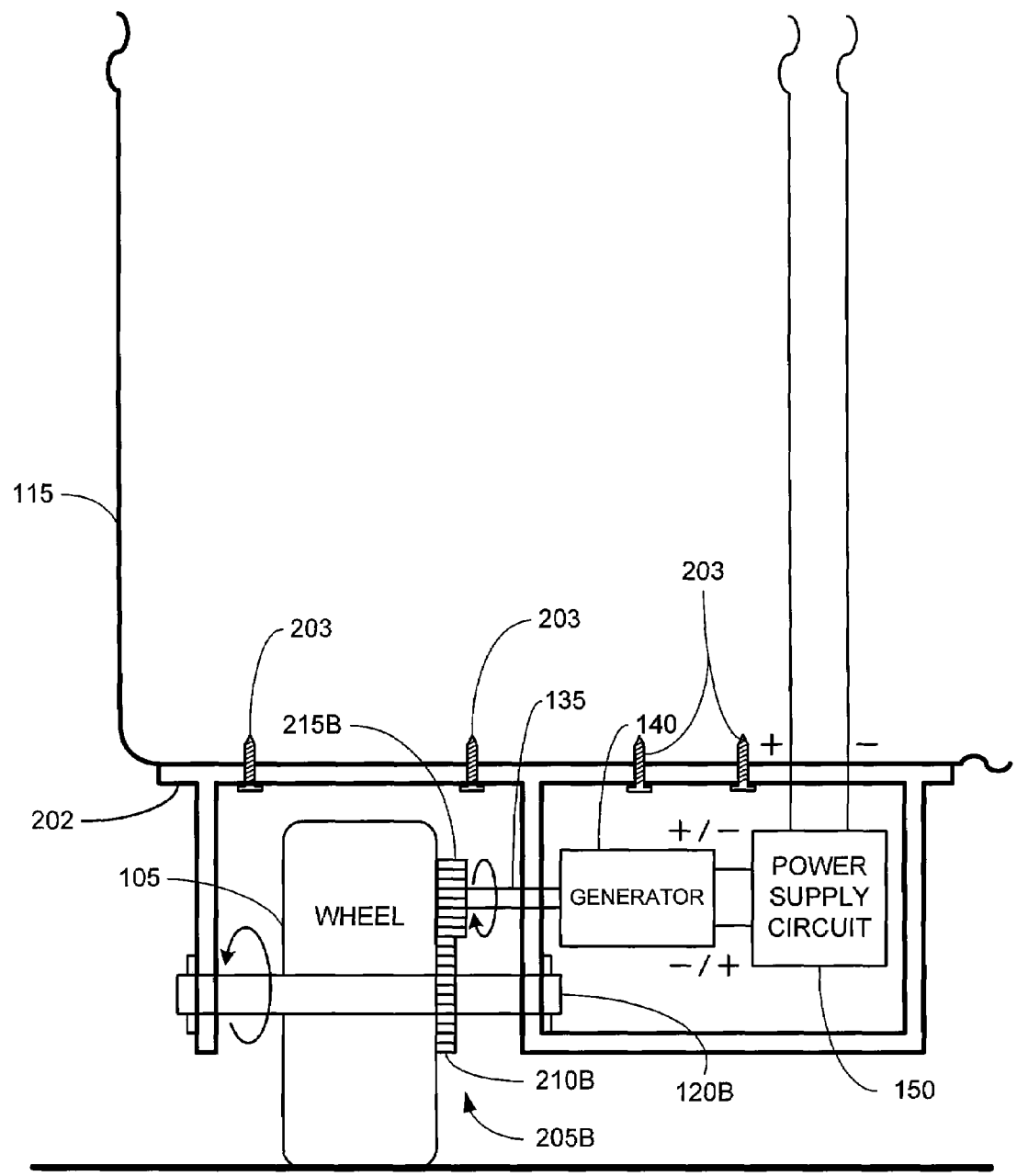
FIG. 2B is a block diagram of a piece of human-propellable luggage, similar to the human propellable luggage of FIG. 2A, except having a chassis which includes the wheel, generator, and power supply circuit, and also uses a gear set where a stationary axle rather than a rotating shaft is coupled with the wheel, and where the wheel gear is integral with the wheel.

FIG. 2B is a block diagram of a portion of a piece of human-propellable luggage 201, similar the human propellable luggage 200 of FIG. 2A, except having a chassis 202 and a different gear set 205B. In this exemplary embodiment, gear set 205B includes a first gear 210B fixedly coupled or integral with wheel 105. First gear 210B may then rotate at the same rate as wheel 105. Second gear 215B is meshed with first gear 205B and communicates the rotation of the wheel to generator 140. Chassis 202 contains wheel 105, axle 120B, gear set 205B, generator 140 and shaft 135, as well as power supply circuit 150. In some embodiments, only some of these components may be contained in chassis 202. Chassis 202 is coupled with body 115 by screws 203. Other chemical and mechanical coupling mechanisms may also be used to couple chassis 202 with body 115, including, but not limited to, nuts and bolts, rivets, and glue.

Figure 3:
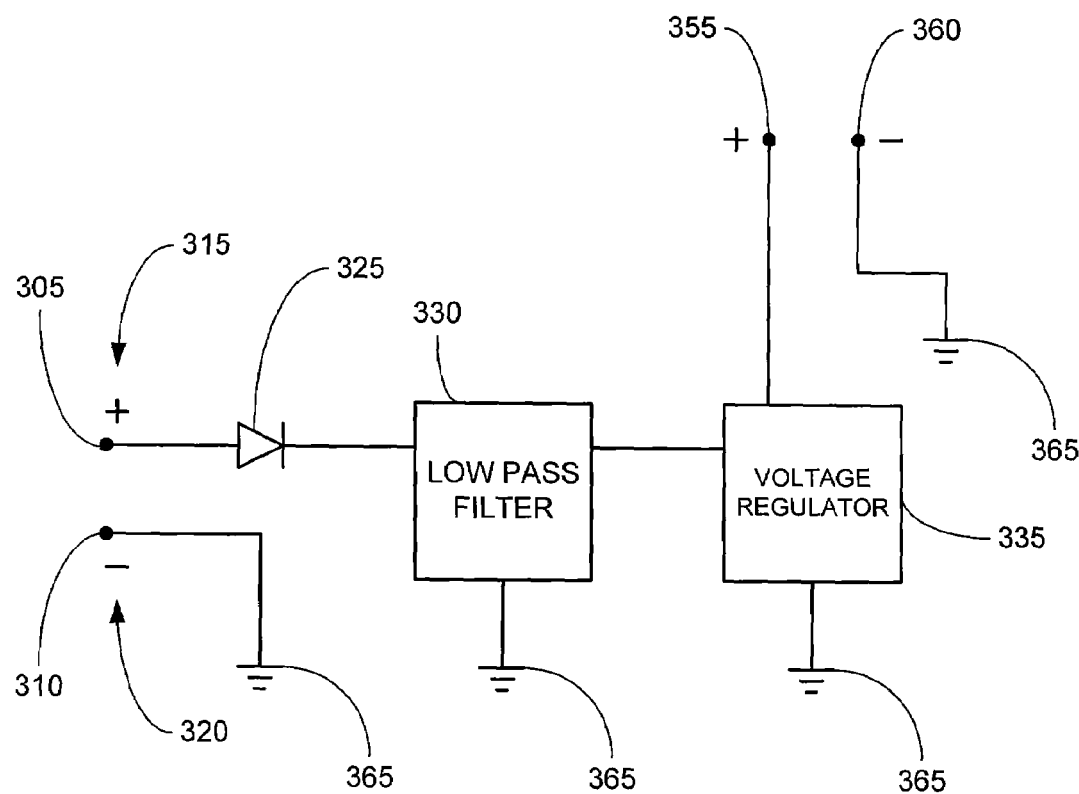
FIG. 3 is a block diagram of a power supply circuit which conditions electrical power received from a generator and has a diode to prevent electrical power from being provided to the generator.

FIG. 3 is a block diagram of a power supply circuit 150A which conditions electrical power received from a generator 140. In this exemplary embodiment, electrical power is received at terminals 305, 310. Unless the polarity is as shown by indicators 315, 320, a diode 325 will not allow power to flow to power supply circuit 150A. In this exemplary embodiment then, power may only flow to power supply circuit 150A if the wheel 105 of the luggage are rotating in one of the two possible directions of rotation. Additionally, diode 325 prevents power from flowing to generator 140, causing it to act like a motor and mechanically power the wheel 105. Power flows from diode 325 to a low pass filter 330. Low pass filter 330 smoothes variations in the voltage or current of the power. Power flows from low pass filter 330 to a voltage regulator 335. Voltage regulator 335 regulates variations in the voltage of the power, producing a more constant output voltage. Power, now conditioned, flows to terminals 355, 360. Note that multiple components of power supply circuit 150A are connected to a common ground 365. Thus in this embodiment, a power supply circuit is shown that prevents power from returning to generator 140, only accepts power with one type of voltage polarity, smoothes and regulates voltage and modifies the voltage and current of the power to produce conditioned power.

Figure 4:
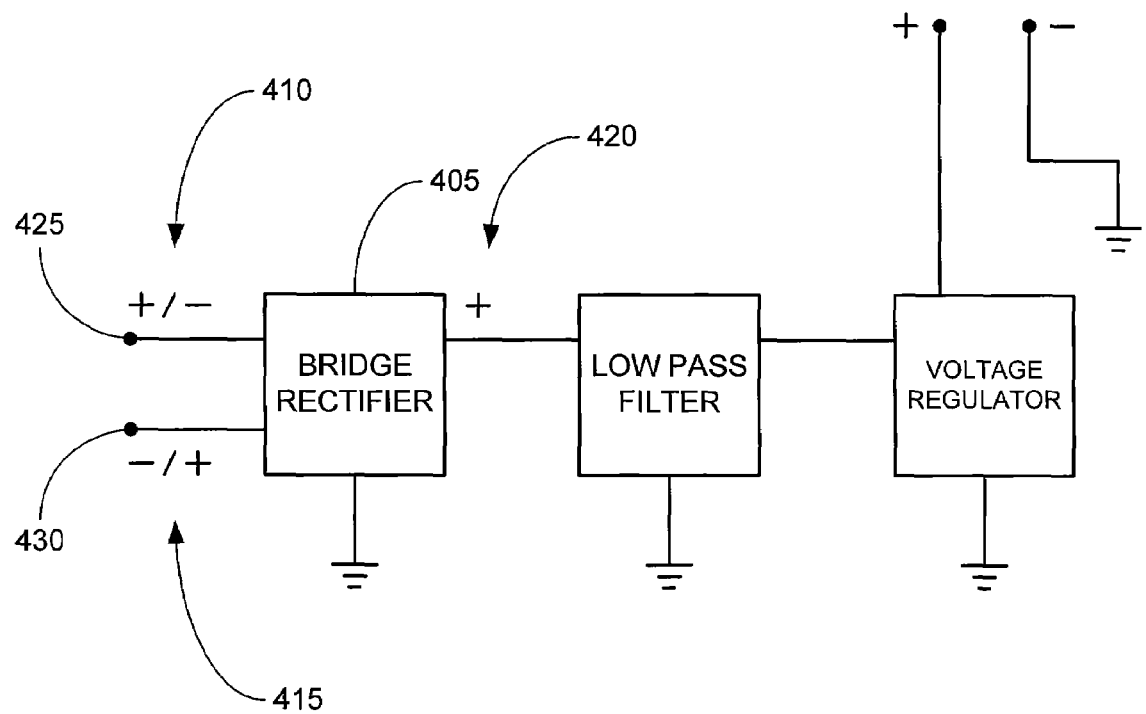
FIG. 4 is a block diagram of a power supply circuit, similar to the power supply circuit of FIG. 3, except using a bridge rectifier rather than a diode to reverse the polarity of electrical power coming from the generator when the polarity received is reversed, so that only forward polarity power is output from the power supply circuit.

FIG. 4 is a block diagram of a power supply circuit 150B, similar to power supply circuit 150A of FIG. 3, except using a bridge rectifier 405 rather than a diode to selectively reverse the polarity of electrical power coming from generator 140. Bridge rectifier 405 rectifies the polarity of any incoming voltage such that a positive polarity is always produced as shown by indicators 410, 415, 420. In this example, if a positive polarity voltage is input at terminal 425, relative to terminal 430, a positive voltage will be output as shown by indicator 420. In the alternate case, if a positive voltage is input at terminal 430, relative to terminal 425, a positive voltage will be output as shown by indicator 420. Therefore, in this embodiment if wheel 105 rotates in either direction, voltage from generator 140 will be rectified. Bridge rectifier 405 also prevents power from returning to generator 140 as diode 325 did in power supply circuit 150A.

Figure 5:
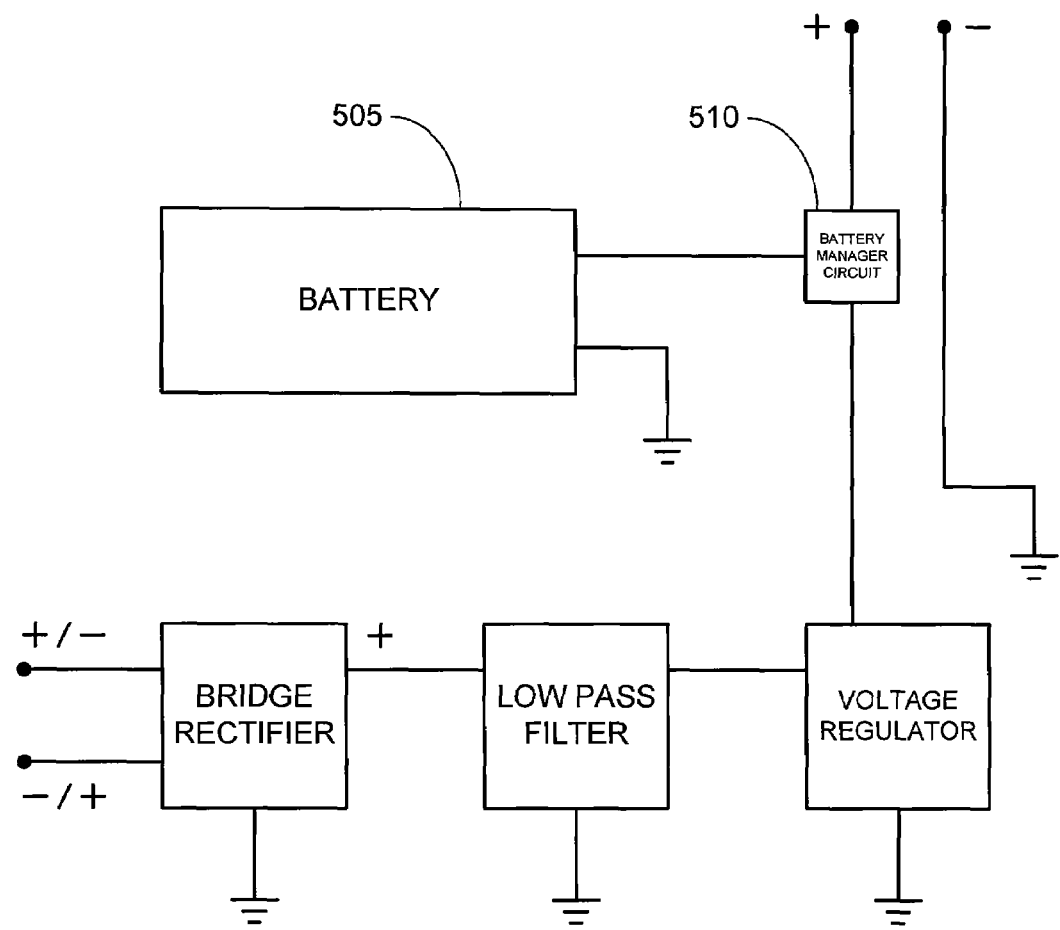
FIG. 5 is a block diagram of a power supply circuit, similar to the power supply circuit of FIG. 4, except also having a battery and a battery manager circuit to store conditioned electrical power.

FIG. 5 is a block diagram of a power supply circuit 150C, similar to power supply circuit 150B of FIG. 4, except also having a battery 505 to store conditioned electrical power. Battery 505 may be configured such that power for an end device connected to power supply circuit 150C may come either from power actively generated by generator 140 coupled with wheel 105, or from battery 505. Power supply circuit 150C may contain a battery manager circuit 510 to regulate charging of the battery. Alternatively, in some embodiments, the battery manager circuit 510 may be contained within the battery. The battery may be physically located with the power supply circuit 150C, or may be remotely located elsewhere in the luggage.

Figure 6:
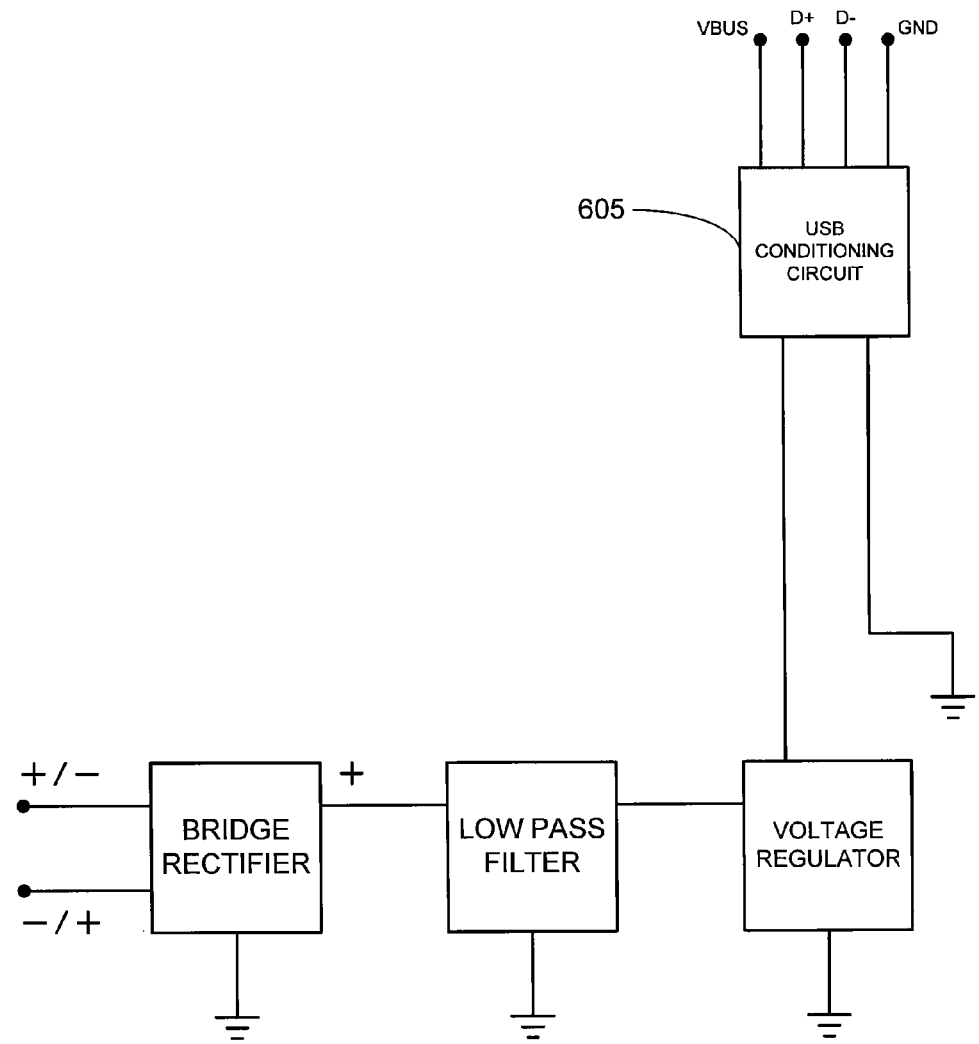
FIG. 6 is a block diagram of a power supply circuit, similar to the power supply circuit of FIG. 5, except also having a USB conditioning circuit to allow the power supply circuit to deliver electrical power to USB devices.

FIG. 6 is a block diagram of a power supply circuit 150D, similar to power supply circuit 150C of FIG. 5, except also having a USB conditioning circuit 605 to allow the power supply circuit to deliver electrical power to USB compatible devices. Many USB devices, as known in the art, have a four terminal connection point. While two of these terminals are reserved for supplying power (VBUS terminal and GND), two of the other terminals are reserved for data transmission (D+ and D−). While some USB devices accept USB power and ignore the data terminals, other USB devices may require that the data terminals be active for the device to accept power from the power terminal. The USB conditioning circuit may be used to provide USB specification compliant transceiver characteristics at the data terminals, thus allowing these USB devices to utilize power from power supply circuit 150D. In some embodiments, the USB conditioning circuit may provide five terminals, with the additional fifth terminal being an identifier signal terminal. Some USB compatible devices may employ even more terminals or contacts. For instance, some USB devices may use a mini-USB terminal, as known in the art, and the USB conditioning circuit may supply a voltage to the identifier signal terminal as required by the mini-USB terminal on certain devices.

Figure 7:
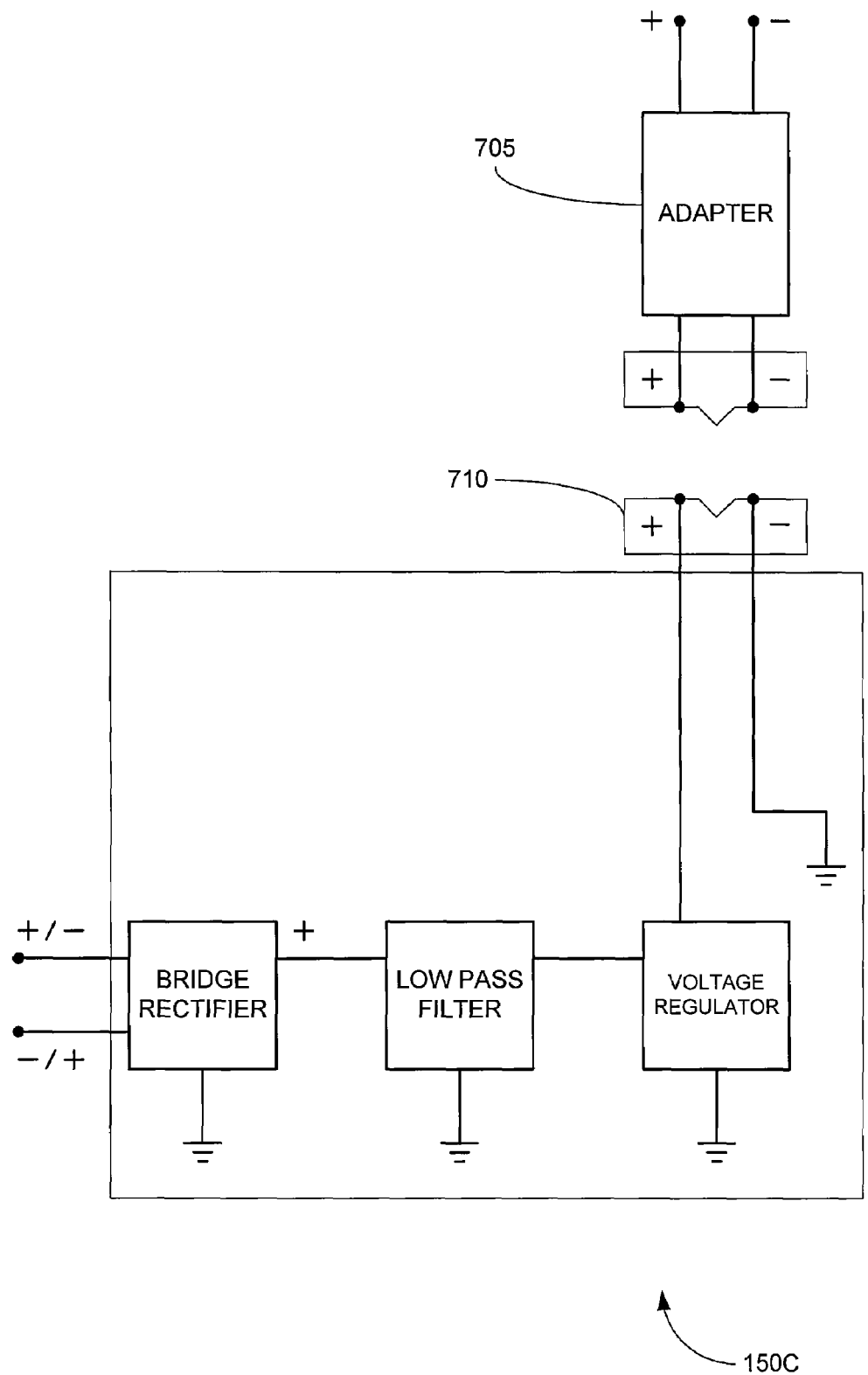
FIG. 7 is a block diagram of a the power supply circuit of FIG. 5, except also showing an adapter to allow the power supply circuit to deliver electrical power to specific devices, possibly through an externally accessible connector.

FIG. 7 is a block diagram of a power supply circuit 150C of FIG. 5, except also showing an adapter 705 to allow the power supply circuit 150C to deliver electrical power to specific end devices. Adapter 705 may, in some embodiments, be merely a length of cable configured to allow some distance between output ports of the power supply circuit 150C and the end device. The adapter may allow for connection of end devices with different physical connection types than power supply circuit 150C as discussed above. Adapter 705 may be configured to couple with externally accessible connector 710. Externally accessible connector 710 may be remotely located from power supply circuit 150C, possibly on a top portion of body 115 for easy accessibility by a user. Externally accessible connector 710 may be mechanically fixedly coupled with body 115, or may be mechanically and electrically coupled with a retractable cord or cable. Various types of externally accessible connectors have been discussed above and will be discussed further below in regards to FIG. 11.

Figure 8:
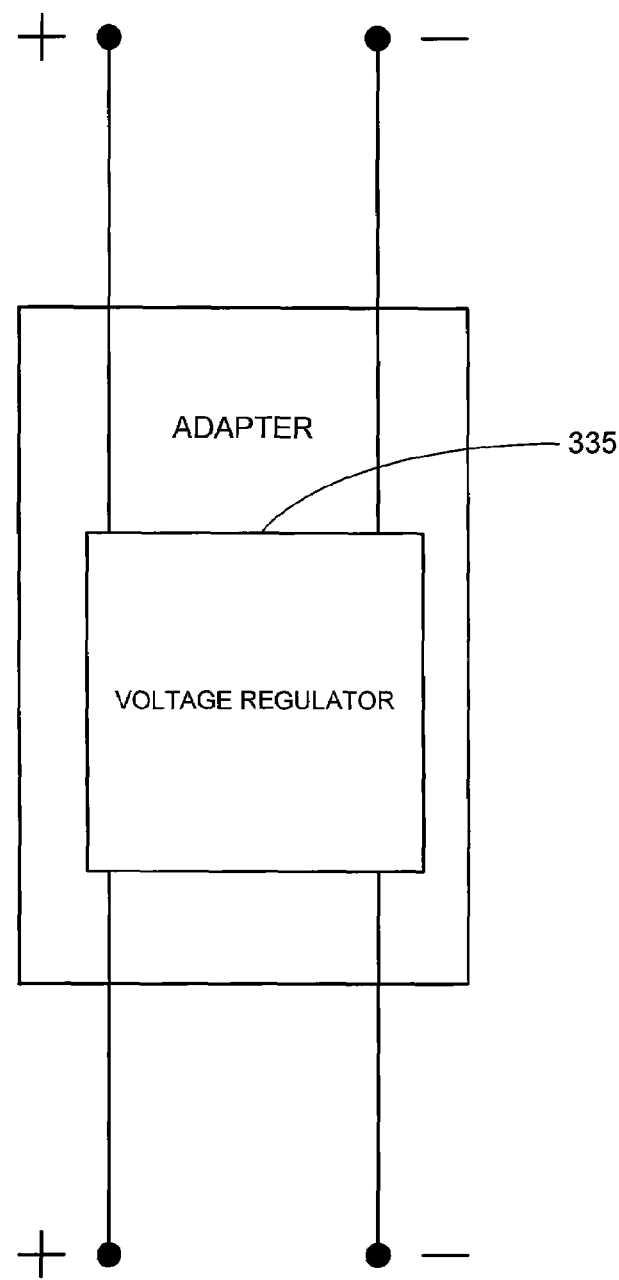
FIG. 8 is a block diagram of an adapter which, when coupled with a power supply circuit, allows delivery of conditioned electrical power to specific devices.
Figure 9:
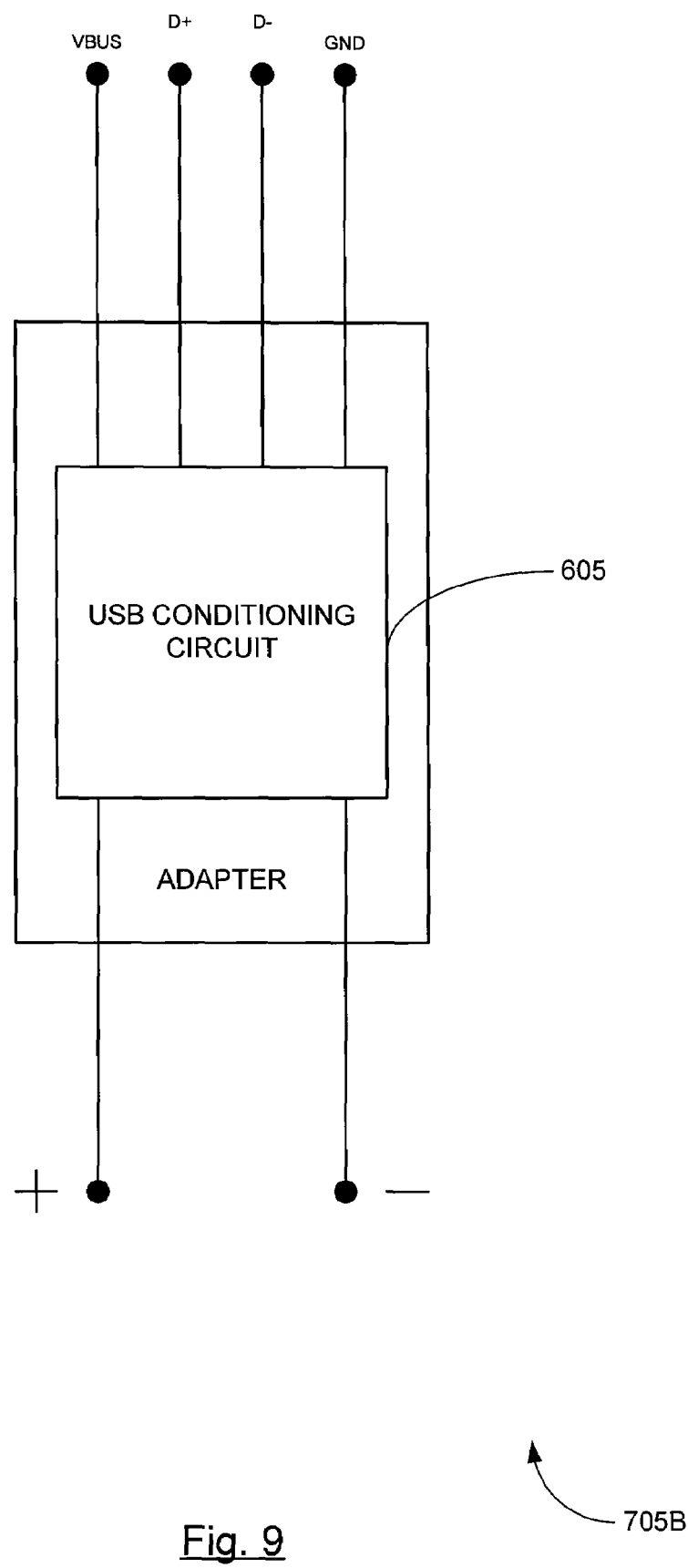
FIG. 9 is a block diagram of an adapter which, when coupled with a power supply circuit, allows delivery of conditioned electrical power to USB devices.

FIG. 8 is a block diagram of an adapter 705A which, when coupled with a power supply circuit 150, allows delivery of conditioned electrical power to specific devices requiring power with a different voltage and current than that output by power supply circuit 150. A voltage regulator 335 may further condition the conditioned power by modifying the magnitude of the voltage and/or changing or limiting the current of the conditioned power before delivering it to the end device. FIG. 9 is a block diagram of an adapter 705B which allows delivery of electrical power to USB devices when coupled with a power supply circuit 150 which is not otherwise configured to deliver conditioned power to a USB device. The adapter includes a USB conditioning circuit 605, possibly similar to that shown in FIG. 6.

Figure 10A:
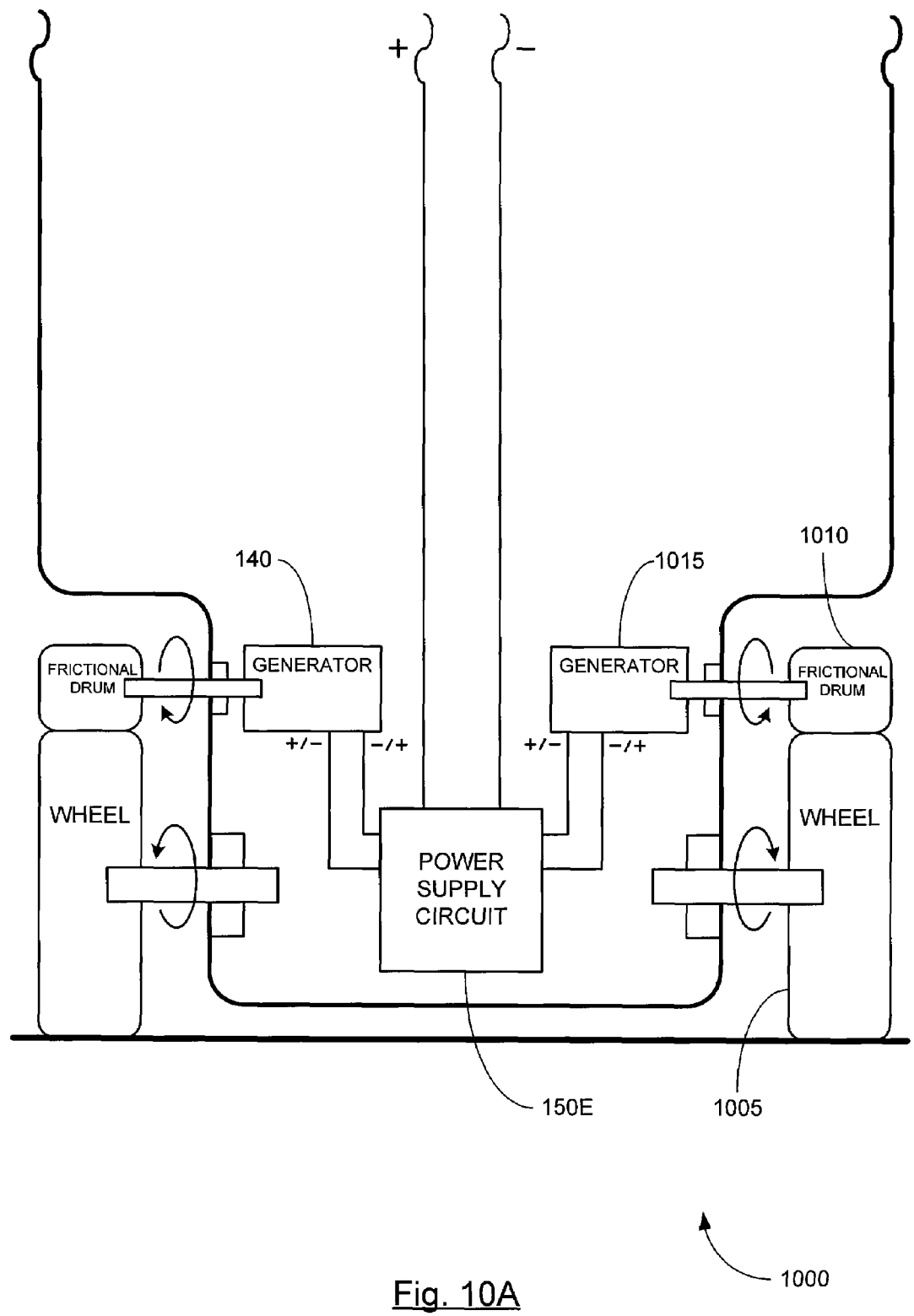
FIG. 10A is a block diagram of a piece of human-propellable luggage, similar to the human propellable luggage of FIG. 1, except having a plurality of wheels and a plurality of generators.

FIG. 10A is a block diagram of a portion of a piece of human-propellable luggage 1000, similar to the human propellable luggage 100 of FIG. 1, except having a second wheel 1005, a second frictional drum 1010, and a second generator 1015. In this embodiment, power supply circuit 150E combines power from the generators 140, 1015, in addition to conditioning the electrical power. It will now be apparent that any number of wheels may be configured to supply power for combination and conditioning to various power supply circuits 150.

Figure 10B:
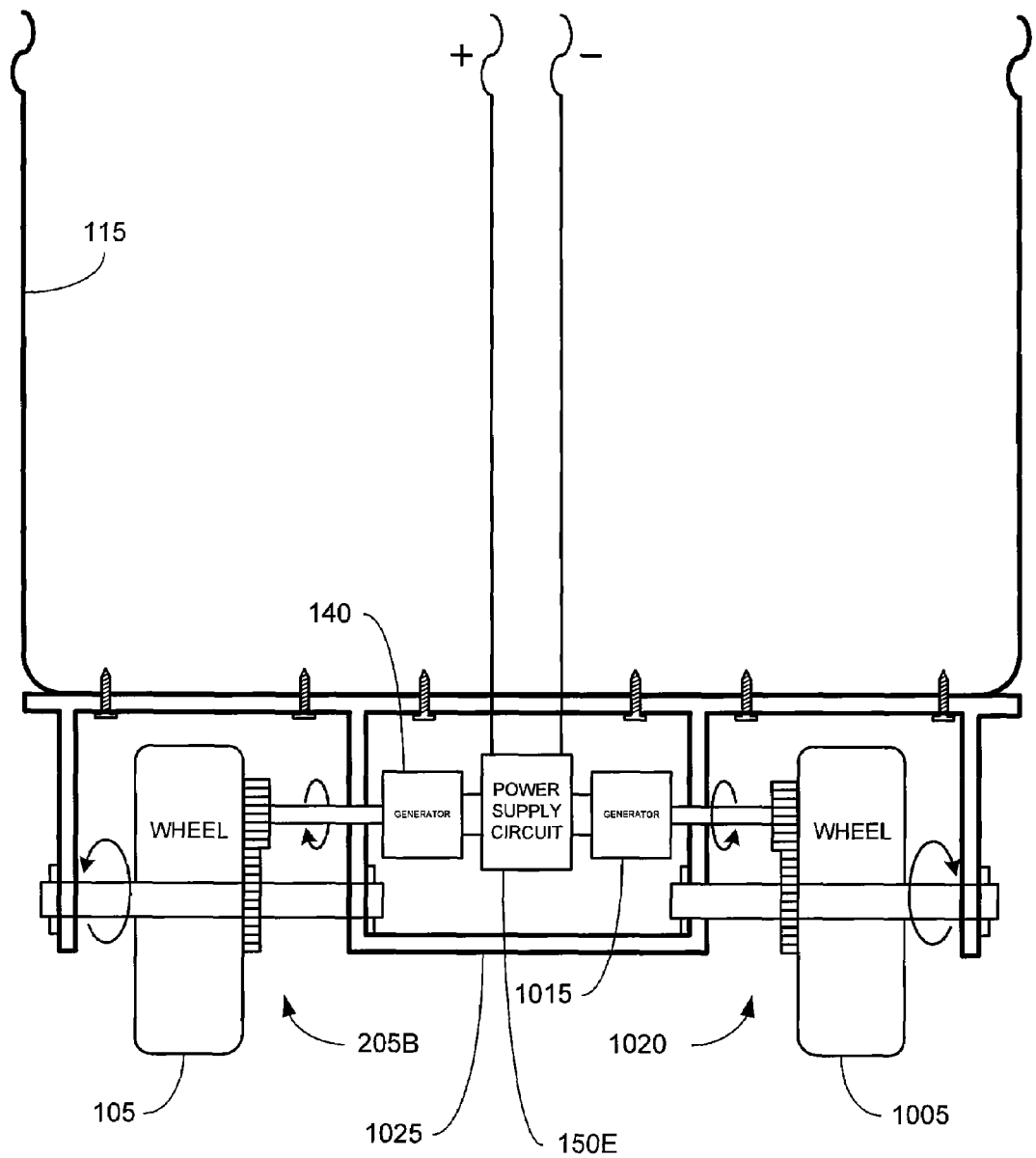
FIG. 10B is a block diagram of a piece of human-propellable luggage, similar to the human propellable luggage of FIG. 10A, except having gear sets instead of frictional drums, and having the wheel, gear sets, generators and power supply circuit contained in a chassis which is coupled to the body of the luggage in a fashion similar to that of FIG. 2B.

FIG. 10B is a block diagram of a piece of human-propellable luggage 1001, similar to the human propellable luggage 1000 of FIG. 10A, except having gear sets 205B, 1020 instead of frictional drums 130, 1010, and having wheels 105, 1005, gear sets 205B, 1020, generators 140, 1015 and power supply circuit 150E contained in a chassis 1025 which is coupled to the body 115 of the luggage 1001, similar to what is shown in FIG. 2B.

Figure 11:
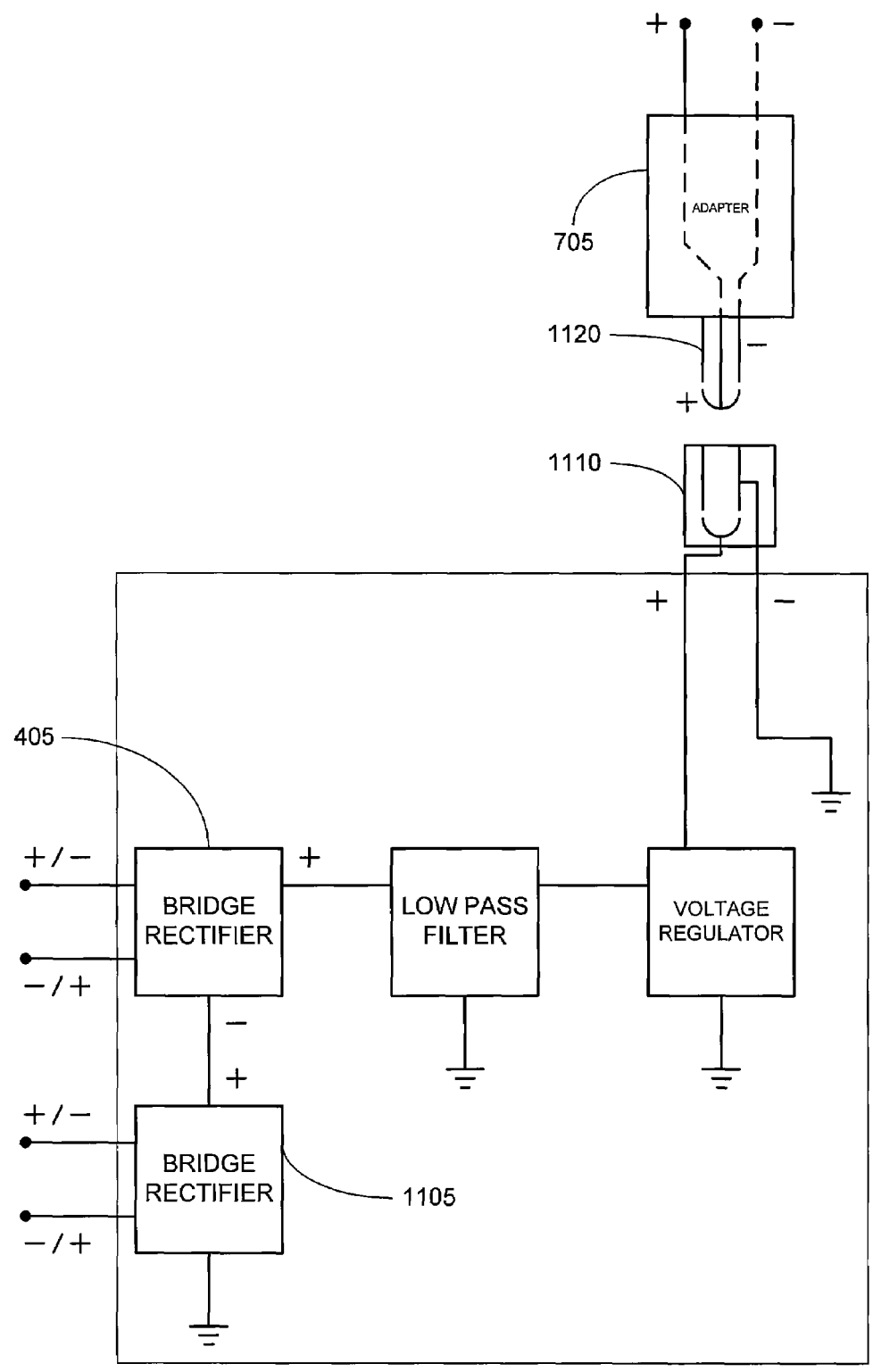
FIG. 11 is a block diagram of a power supply circuit which combines and conditions electrical power received from a plurality of generators; additionally, an externally accessible connector is shown.

FIG. 11 is a block diagram of power supply circuit 150 which combines and conditions electrical power received from two of generators 140, 1015. FIG. 11 is similar to FIG. 4, except having a second bridge rectifier 1105 configured to accept power from second generator 1015 and also an externally accessible connector 1110. Power from second bridge rectifier 1105 is passed on to bridge rectifier 405 and further conditioned as described previously by the power supply circuit 150E. In this manner, electrical power from multiple generators may be combined and conditioned for delivery to an end device (which may also contain a battery), possibly through adapter 705. Additionally, the bridge rectifiers 140, 1015 may individually reverse the polarity of the power coming from each generator 140, 1015 so that no matter which polarity of voltage is being produced by each generator (possibly because of different rotational directions of the various wheels) a greater summed voltage is achieved by power supple circuit 150E. Externally accessible connector 1110 is shown as a two conductor barrel or tip connector in FIG. 11. Externally accessible connector 1110 may be located anywhere on the luggage, or possible at the end of a cable, cord or adapter to provide a quick disconnect point for an end device charging cable, cord or adapter. Though shown as a barrel or tip connector (with accompanying plug 1120 on adapter 705, any format of quick disconnect or other electrical connector known in the art could be employed.

Figure 12:
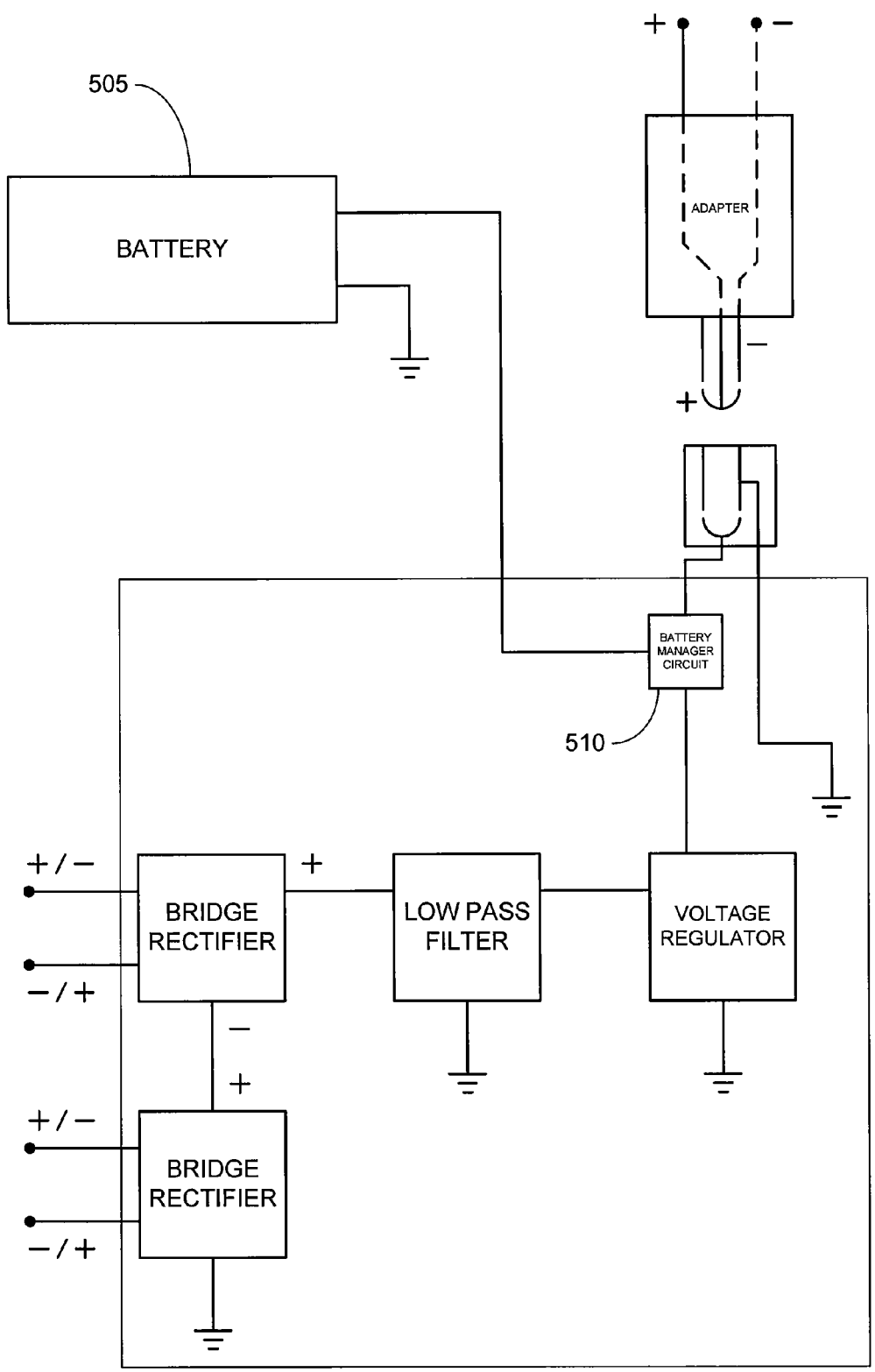
FIG. 12 is a block diagram of a power supply circuit which combines and conditions electrical power received from a plurality of generators, similar to the power supply circuit of FIG. 11, except also having a battery and a battery manager circuit.

FIG. 12 is a block diagram of power supply circuit 150F, which is similar to power supply circuit 150E in FIG. 11 except also having a battery 505 and a battery manager circuit 510. Battery 505 and battery manager circuit 510 work as described in relation to FIG. 5 to store electrical power not being used immediately by a user of the luggage. Battery 505 may be located with or in close proximity to power supply circuit 150F in some embodiments. In other embodiments the battery may be located elsewhere in the luggage.

Figure 13:
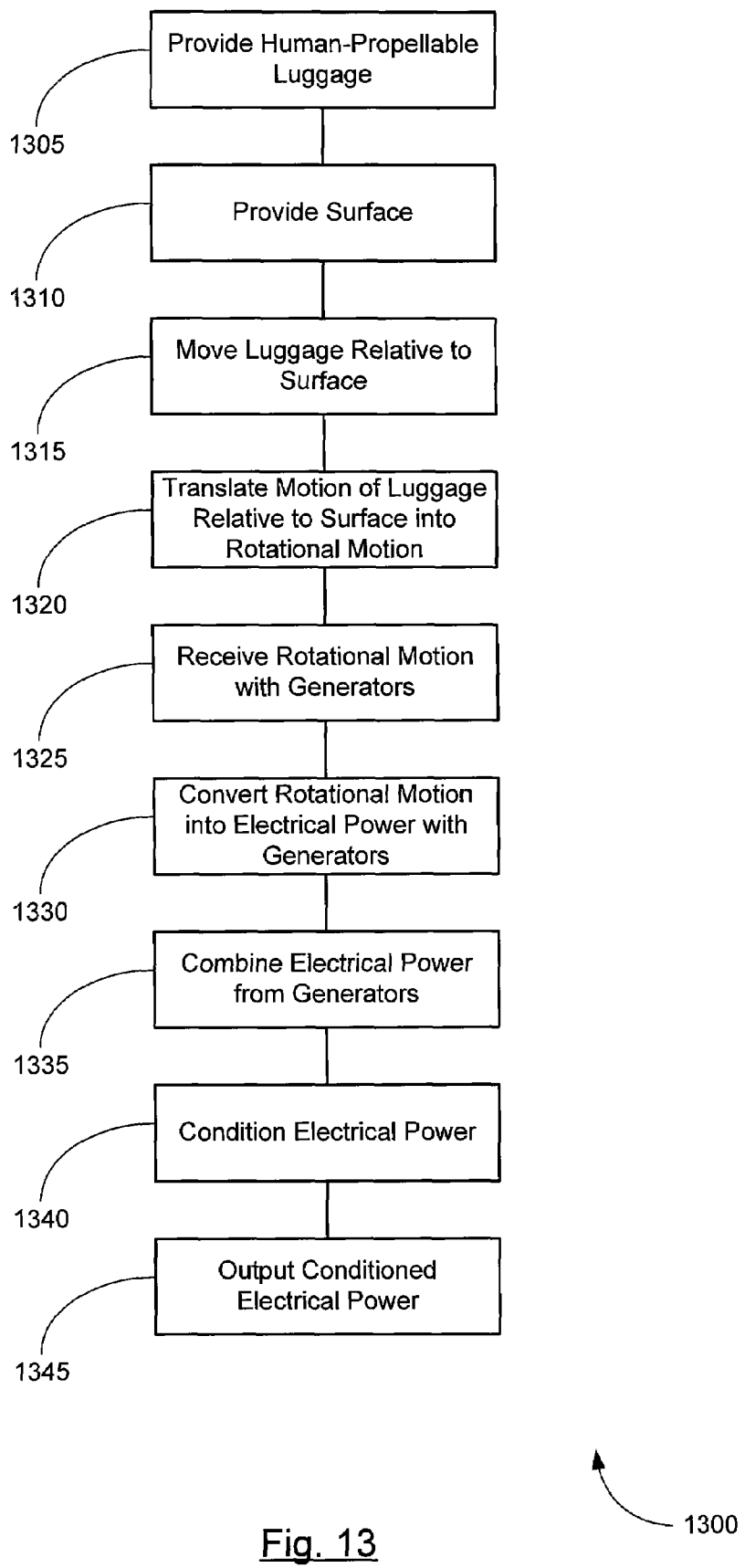
FIG. 13 is a block diagram of a method of converting motion of a piece of human-propellable luggage into conditioned electrical power.

FIG. 13 is a block diagram of a method 1300 of converting motion of a piece of human-propellable luggage into conditioned electrical power. At block 1305, a piece of human-propellable luggage may be provided. A surface may be provided at block 1310. At block 1315, the luggage may be moved relative to the surface. The luggage may be moved relative to the surface by a user, or possibly due to gravity and a sloping characteristic of the surface. The motion of the luggage relative to the surface may be translated into rotational motion at block 1320. Wheels coupled to the luggage and in contact with the surface may be used to perform this step, though other devices may be used including, for example, a free-swinging pendulum-gear and pinion system.

At block 1325, the rotational motion may be received by a generator or generators. The rotational motion may be converted to electrical power by the generator or generators at block 1330. At block 1335, electrical power from multiple generators may be combined if multiple generators are employed. The electrical power may be conditioned at block 1340. Conditioning, as described above, may include, for example, smoothing and regulating the voltage and/or current of the power, re-orientating the polarity of the voltage of the power, changing the magnitude of the voltage and/or current of the power, applying a USB conditioning circuit to the power, or any other operation to make the power usable by an end device or an end device's battery. At block 1345, the conditioned electrical power may be outputted, possibly to an adapter, a battery in the luggage, or possibly directly to an end device or an end device's battery.

A number of variations and modifications of the disclosed embodiments can also be used. For example, some of the described embodiments involve moving luggage to generate electrical power, but other embodiments could involve bicycles, shopping carts, wheel-chair, wheeled toys or other wheeled objects. Such electrical power may be used in some embodiments to provide video programming and advertisements to a display device, possibly an LCD screen. Additionally, other devices such as solar panels may be used to supply additional electrical power to the power supply circuit to be combined and/or conditioned as described above. End devices may also be integral with some embodiments, meaning that the luggage might, for example, contain a built-in mobile phone, computer, and/or audio/video devices which is powered by the power provided by the power supply circuit. In some embodiments, stored electrical power may be used to power a generator and turn a wheel, reversing the generator's function, and assisting in moving the luggage.

The invention has now been described in detail for the purposes of clarity and understanding. However, it will be appreciated that certain changes and modifications may be practiced within the scope of the appended claims.

What is claimed is:

1. A human-propellable luggage which converts motion of the human-propellable luggage into conditioned electrical power, the human-propellable luggage comprising:
   a body, wherein:
      the body is configured to support an object; and
      the body is further configured to be moved by a force exerted by a user;
   a wheel, wherein:
      the wheel defines an axis of rotation;
      the wheel is coupled with the body;
      the wheel is configured to be in contact with a surface; and
      the wheel is further configured to rotate about the axis of rotation when the body is moved relative to the surface;
   a generator, wherein:
      the generator is coupled with the wheel;
      the generator is configured to convert the rotation of the wheel about the axis of rotation into electrical power; and
      the generator is further configured to provide the electrical power; and
   a power supply circuit, wherein:
      the power supply circuit is coupled with the generator;
      the power supply circuit is configured to receive the electrical power from the generator;
      the power supply circuit is further configured to condition the electrical power;
      the power supply circuit comprises a Universal Serial Bus conditioning circuit configured to provide two data signal voltages; and
      the power supply circuit is further configured to provide the conditioned electrical power.

2. The human-propellable luggage which converts motion of the human-propellable luggage into conditioned electrical power of claim 1, wherein human-propellable luggage further comprises a gear set, and wherein the generator being coupled with the wheel comprises:
   the generator coupled with the gear set; and
   the gear set coupled with the wheel.

3. The human-propellable luggage which converts motion of the human-propellable luggage into conditioned electrical power of claim 1, wherein the electrical power provided by the generator is characterized by a voltage and a current, and wherein the power supply circuit being configured to condition the electrical power comprises the power supply circuit being configured to smooth and regulate variations in the voltage or current of the electrical power provided by the generator.

4. The human-propellable luggage which converts motion of the human-propellable luggage into conditioned electrical power of claim 1, wherein the electrical power provided by the generator is characterized by a voltage having a polarity, and wherein the power supply circuit being configured to condition the electrical power comprises the power supply circuit being configured to reverse the polarity of the voltage of the electrical power provided by the generator when one polarity of voltage is received from the generator.

5. The human-propellable luggage which converts motion of the human-propellable luggage into conditioned electrical power of claim 1, wherein the electrical power provided by the generator is characterized by a voltage and a current, and wherein the power supply circuit comprises:
   a low pass filter configured to smooth variations in the voltage or the current of the electrical power provided by the generator; and
   a voltage regulator configured to regulate variations in the voltage of the electrical power provided by the generator.

6. The human-propellable luggage which converts motion of the human-propellable luggage into conditioned electrical power of claim 1, wherein the electrical power provided by the generator is characterized by a voltage having a polarity, and wherein the power supply circuit comprises a bridge rectifier configured to reverse the polarity of the voltage of the electrical power provided by the generator when a certain polarity of voltage is received from the generator.

7. The human-propellable luggage which converts motion of the human-propellable luggage into conditioned electrical power of claim 1, wherein the power supply circuit further comprises a battery, wherein the battery is configured to:
   receive the conditioned electrical power; and
   store the conditioned electrical power.

8. The human-propellable luggage which converts motion of the human-propellable luggage into conditioned electrical power of claim 1, further comprising an adapter, wherein the adapter is configured to:
   receive the conditioned electrical power from the power supply circuit; and
   provide the conditioned electrical power to an end device.

9. The human-propellable luggage which converts motion of the human-propellable luggage into conditioned electrical power of claim 8, wherein the adapter comprises a secondary circuit, the secondary circuit configured to further condition the conditioned electrical power received from the power supply circuit before providing the conditioned electrical power to an end device.

10. The human-propellable luggage which converts motion of the human-propellable luggage into conditioned electrical power of claim 1, further comprising a chassis, wherein the wheel and the generator are coupled with the chassis, and the chassis is coupled with the body.

11. The human-propellable luggage which converts motion of the human-propellable luggage into conditioned electrical power of claim 1, further comprising a chassis, wherein the wheel, the generator, and the power supply circuit are coupled with the chassis, and the chassis is coupled with the body.

12. The human-propellable luggage which converts motion of the human-propellable luggage into conditioned electrical power of claim 1, further comprising an externally accessible connector, wherein the externally accessible connector is coupled with the power supply circuit and configured to provide the conditioned electrical power.

13. A human-propellable luggage which converts motion of the human-propellable luggage into conditioned electrical power, the human-propellable luggage comprising:
   a body, wherein:
      the body is configured to support an object; and
      the body is further configured to be moved by a force exerted by a user;

a plurality of wheels, wherein:
  each wheel defines an axis of rotation;
  each wheel is coupled with the body;
  each wheel is configured to be in contact with a surface; and
  each wheel is further configured to rotate about the axis of rotation when the body is moved relative to the surface;
a plurality of generators, wherein:
  each generator is coupled with one wheel;
  each generator is configured to convert the rotation of the coupled wheel about the axis of rotation of the coupled wheel into electrical power; and
  each generator is further configured to provide the electrical power; and
a power supply circuit, wherein:
  the power supply circuit is coupled with the plurality of generators;
  the power supply circuit is configured to receive the electrical power from the plurality of generators;
  the power supply circuit is further configured to combine and condition the electrical power received from the plurality of generators;
  the power supply circuit comprises a Universal Serial Bus conditioning circuit configured to provide two data signal voltages; and
  the power supply circuit is further configured to provide the combined and conditioned electrical power.

14. The human-propellable luggage which converts motion of the human-propellable luggage into conditioned electrical power of claim 13, wherein the electrical power provided by each generator is characterized by a voltage having a polarity, and wherein the power supply circuit being configured to condition the electrical power comprises the power supply circuit being configured to reverse the polarity of the voltage of the electrical power provided by each generator when a certain polarity of voltage is received from each generator.

15. The human-propellable luggage which converts motion of the human-propellable luggage into conditioned electrical power of claim 13, wherein the power supply circuit comprises a plurality of bridge rectifiers configured to combine the electrical power provided by the plurality of generators.

16. The human-propellable luggage which converts motion of the human-propellable luggage into conditioned electrical power of claim 13, wherein the power supply circuit further comprises a battery, wherein the battery is configured to:
  receive the combined and conditioned power; and
  store the combined and conditioned power.

17. The human-propellable luggage which converts motion of the human-propellable luggage into conditioned electrical power of claim 13, further comprising an adapter, wherein the adapter is configured to:
  receive the conditioned electrical power from the power supply circuit; and
  provide the conditioned electrical power to an end device.

18. The human-propellable luggage which converts motion of the human-propellable luggage into conditioned electrical power of claim 17, wherein the adapter comprises a secondary circuit, the secondary circuit configured to further condition the conditioned electrical power received from the power supply circuit before providing the conditioned power to an end device.

19. The human-propellable luggage which converts motion of the human-propellable luggage into conditioned electrical power of claim 13, further comprising at least one chassis, wherein each chassis is coupled with at least one wheel and at least one generator, and each chassis is coupled with the body.

20. The human-propellable luggage which converts motion of the human-propellable luggage into conditioned electrical power of claim 13, further comprising a chassis wherein each wheel, each generator, and the power supply circuit are coupled to the chassis.

21. The human-propellable luggage which converts motion of the human-propellable luggage into conditioned electrical power of claim 13, further comprising an externally accessible connector, wherein the externally accessible connector is coupled with the power supply circuit and configured to provide the conditioned electrical power.

22. A method of converting motion of a human-propellable luggage into conditioned electrical power, the method comprising:
  providing the human-propellable luggage;
  providing a surface;
  translating the motion of the human-propellable luggage relative to the surface into rotational motion, wherein the motion relative to the surface is produced during normal operation of the human-propellable luggage;
  receiving the rotational motion with at least one generator;
  converting the rotational motion into electrical power with the at least one generator;
  conditioning the electrical power, wherein the electrical power provided by the generator is characterized by a voltage having a polarity, and wherein conditioning the electrical power comprises reversing the polarity of the voltage of the electrical power provided by the generator when one polarity of voltage is received from the generator; and
  outputting the conditioned electrical power.

23. The method of converting motion of a human-propellable luggage into conditioned electrical power of claim 22, the method further comprising combining the electrical power from a plurality of generators.

24. A human-propellable luggage which converts motion of the human-propellable luggage into electrical power, the human-propellable luggage comprising:
  a body, wherein:
    the body is configured to support an object; and
    the body is further configured to be moved by a force exerted by a user;
  a chassis, wherein the chassis is coupled with the body, and wherein the chassis comprises:
    a wheel, wherein:
      the wheel defines an axis of rotation;
      the wheel is coupled with the body;
      the wheel is configured to be in contact with a surface; and
      the wheel is further configured to rotate about the axis of rotation when the body is moved relative to the surface; and
    a generator; wherein
      the generator is coupled with the wheel;
      the generator is configured to convert the rotation of the wheel about the axis of rotation into electrical power; and
      the generator is further configured to provide the electrical power; and
  a power supply circuit comprising a Universal Serial Bus conditioning circuit configured to provide two data signal voltages.

25. The human-propellable luggage which converts motion of the human-propellable luggage into electrical power of claim 24, wherein the chassis further comprises a power supply circuit, wherein:
the power supply circuit is coupled with the generator;
the power supply circuit is configured to receive the electrical power from the generator;
the power supply circuit is further configured to condition the electrical power; and
the power supply circuit is further configured to provide the conditioned electrical power.

26. A human-propellable luggage which converts motion of the human-propellable luggage into electrical power, the human-propellable luggage comprising:
body, wherein:
the body is configured to support an object; and
the body is further configured to be moved by a force exerted by a user;
a wheel, wherein:
the wheel defines an axis of rotation;
the wheel is coupled with the body;
the wheel is configured to be in contact with a surface; and
the wheel is further configured to rotate about the axis of rotation when the body is moved relative to the surface;
a generator, wherein:
the generator is coupled with the wheel;
the generator is configured to convert the rotation of the wheel about the axis of rotation into electrical power; and
the generator is further configured to provide the electrical power, wherein the electrical power provided by the generator is characterized by a voltage having a polarity, and wherein a power supply circuit is configured to reverse the polarity of the voltage of the electrical power provided by the generator when one polarity of voltage is received from the generator;
an externally accessible connector, wherein:
the externally accessible connector is configured to receive electrical power from the generator; and
the externally accessible connector is further configured to provide the electrical power; and
an adapter, wherein:
the adapter is configured to receive electrical power from the externally accessible connector; and
the adapter is further configured to provide the electrical power.

27. A human-propellable luggage which converts motion of the human-propellable luggage into electrical power, the human-propellable luggage comprising:
a body, wherein:
the body is configured to support an object; and
the body is further configured to be moved by a force exerted by a user;
a plurality of wheels, wherein:
each wheel defines an axis of rotation;
each wheel is coupled with the body;
each wheel is configured to be in contact with a surface; and
each wheel is further configured to rotate about the axis of rotation when the body is moved relative to the surface;
a plurality of generators, wherein:
each generator is coupled with one wheel;
each generator is configured to convert the rotation of the coupled wheel about the axis of rotation of the coupled wheel into electrical power; and
each generator is further configured to provide the electrical power; and
a power supply circuit comprising a Universal Serial Bus conditioning circuit configured to provide two data signal voltages.

28. The method of converting motion of a human-propellable luggage into conditioned electrical power of claim 22, wherein the method further comprises providing a Universal Serial Bus conditioning circuit configured to provide two data signal voltages.

* * * * *